United States Patent
Jain et al.

(10) Patent No.: US 10,135,484 B2
(45) Date of Patent: *Nov. 20, 2018

(54) ADAPTIVE ANTENNA SELECTION FOR INTERFERENCE MITIGATION

(71) Applicant: Apple Inc., Cupertino, CA (US)

(72) Inventors: Swapnil S. Jain, Davis, CA (US); Nicholas M. McDonnell, San Jose, CA (US); Wen Zhao, San Jose, CA (US); Paul V. Flynn, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,588

(22) Filed: Jul. 17, 2017

(65) Prior Publication Data

US 2017/0338850 A1 Nov. 23, 2017

Related U.S. Application Data

(63) Continuation of application No. 14/870,087, filed on Sep. 30, 2015, now Pat. No. 9,712,204.

(51) Int. Cl.
| | |
|---|---|
| *H04B 7/00* | (2006.01) |
| *H04B 1/401* | (2015.01) |
| *H04B 1/44* | (2006.01) |
| *H04B 15/00* | (2006.01) |
| *H04W 72/04* | (2009.01) |

(Continued)

(52) U.S. Cl.
CPC .............. *H04B 1/401* (2013.01); *H04B 1/44* (2013.01); *H04B 15/00* (2013.01);
(Continued)

(58) Field of Classification Search
USPC ............ 455/63.1, 78, 501, 296, 561, 435.1, 455/456.1, 25, 434; 370/331, 252, 329,
(Continued)

(56) References Cited

U.S. PATENT DOCUMENTS

| 2009/0318087 A1 | 12/2009 | Mattila et al. |
|---|---|---|
| 2009/0323652 A1 | 12/2009 | Chen et al. |

(Continued)

FOREIGN PATENT DOCUMENTS

| WO | WO 2007/028448 | 3/2007 |
|---|---|---|
| WO | WO 2011/084717 | 7/2011 |

OTHER PUBLICATIONS

Office Action, Korean Patent Application No. 10-2016-0111609, dated May 16, 2017, 6 pages.

*Primary Examiner* — Ganiyu A Hanidu
(74) *Attorney, Agent, or Firm* — Meyertons Hood Kivlin Kowert & Goetzel, P.C.; Jeffrey C. Hood (57) ABSTRACT

This disclosure relates to performing antenna selection to reduce interference in a wireless device. According to some embodiments, it may be determined whether simultaneous communication according to first and second wireless communication technologies causes performance degradation to a third wireless communication technology. If the simultaneous communication according to first and second wireless communication technologies does cause performance degradation to the third wireless communication technology, selection of antenna(s) used for the communications may be based at least in part on the determination that the simultaneous communication according to the first and second wireless communication technologies causes performance degradation to the third wireless communication technology.

20 Claims, 6 Drawing Sheets

(51) Int. Cl.
*H04W 84/12* (2009.01)
*H04W 88/06* (2009.01)

(52) U.S. Cl.
CPC ........ *H04W 72/0453* (2013.01); *H04W 84/12* (2013.01); *H04W 88/06* (2013.01)

(58) Field of Classification Search
USPC .................. 370/208, 310, 335, 444, 342
See application file for complete search history.

(56) References Cited

U.S. PATENT DOCUMENTS

| | | | |
|---|---|---|---|
| 2010/0273426 A1* | 10/2010 | Walley | H04W 52/265 455/63.1 |
| 2011/0081858 A1 | 4/2011 | Tolentino et al. | |
| 2012/0149411 A1 | 6/2012 | Miyoshi et al. | |
| 2013/0148636 A1 | 6/2013 | Lum et al. | |
| 2013/0207839 A1 | 8/2013 | Simic et al. | |
| 2013/0303214 A1* | 11/2013 | Ahmadi | H04W 72/1215 455/501 |
| 2014/0140224 A1 | 5/2014 | Hakansson et al. | |
| 2014/0221028 A1 | 8/2014 | Desai et al. | |
| 2014/0226502 A1* | 8/2014 | Behnamfar | H04L 1/00 370/252 |
| 2014/0286213 A1* | 9/2014 | Morrison | H04W 52/0261 370/311 |
| 2014/0292570 A1* | 10/2014 | Wallace | G01S 19/41 342/357.42 |
| 2015/0036656 A1* | 2/2015 | McCarthy | H04B 7/0871 370/331 |

\* cited by examiner

ADAPTIVE ANTENNA SELECTION FOR INTERFERENCE MITIGATION

PRIORITY CLAIM

This application is a continuation of U.S. patent application Ser. No. 14/870,087 titled "Adaptive Antenna Selection for Interference Mitigation", filed on Sep. 30, 2015, whose inventors were Swapnil S. Jain, Nick M. McDonnell, Wen Zhao, and Paul V. Flynn and which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, including adaptively selecting antennas to reduce interference.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, Global Navigational Satellite Systems (e.g., Global Positioning System (GPS), GLONASS, Galileo, BeiDou) and others.

In many instances, a wireless device may implement multiple such wireless communication technologies. This can lead to potential interference problems, for example if communication by one or more wireless communication technologies interferes with communication by another wireless communication technology operating in the same frequency band. Furthermore, in some cases, even if signals used by different wireless communication technologies do not occupy similar frequency bands, intermodulation effects of transmissions by those wireless communication technologies can interfere with other wireless communication technologies.

SUMMARY

Embodiments are presented herein of apparatuses, systems, and methods for performing antenna selection for wireless communication in a manner that takes into account intermodulation and other potentially performance degrading effects.

The techniques provided herein may, according to some embodiments, reduce performance degradation to a wireless communication technology, such as a global navigational satellite system (GNSS), caused by intermodulation and/or other interference resulting from transmission by other wireless communication technologies, such as Cellular and Wi-Fi/Bluetooth communication technologies.

According to some embodiments, a wireless device may determine whether there is potential for (e.g., intermodulation) interference at the wireless device, for example due to transmissions by the wireless device. For example, if certain wireless communication technologies are operating on transmission frequencies that could produce an intermodulation product in a frequency band that is also used (e.g., by another wireless communication technology) by the wireless device, there may be potential for intermodulation interference at the wireless device. If the affected frequency band is not in use (e.g., if the wireless communication technology that could use the affected frequency band is not active, or is using a different frequency band), the potential intermodulation interference may not actually occur. However, if the affected frequency band is or may become in use, it may improve performance to mitigate the intermodulation interference effects.

When there is potential for intermodulation or other interference, antenna selection may be performed in such a manner as to mitigate the interference. For example, one or more of the antennas used for the transmissions that could combine to produce intermodulation interference may be selected to increase or potentially even provide a maximum possible isolation with respect to an antenna using (or potentially using) the affected frequency band. This may reduce the impact of the intermodulation interference, as the strength of the intermodulation product at the impacted antenna may be reduced as a result of such a proactive antenna selection process.

The techniques described herein may be implemented in and/or used with a number of different types of devices, including but not limited to cellular phones, tablet computers, wearable computing devices, portable media players, and any of various other computing devices.

The mechanisms for mitigating interference described herein may be used in conjunction with any of various types of interference, including but not limited to intermodulation or harmonic products, blocking effects, out-of-band noise leakage, etc.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
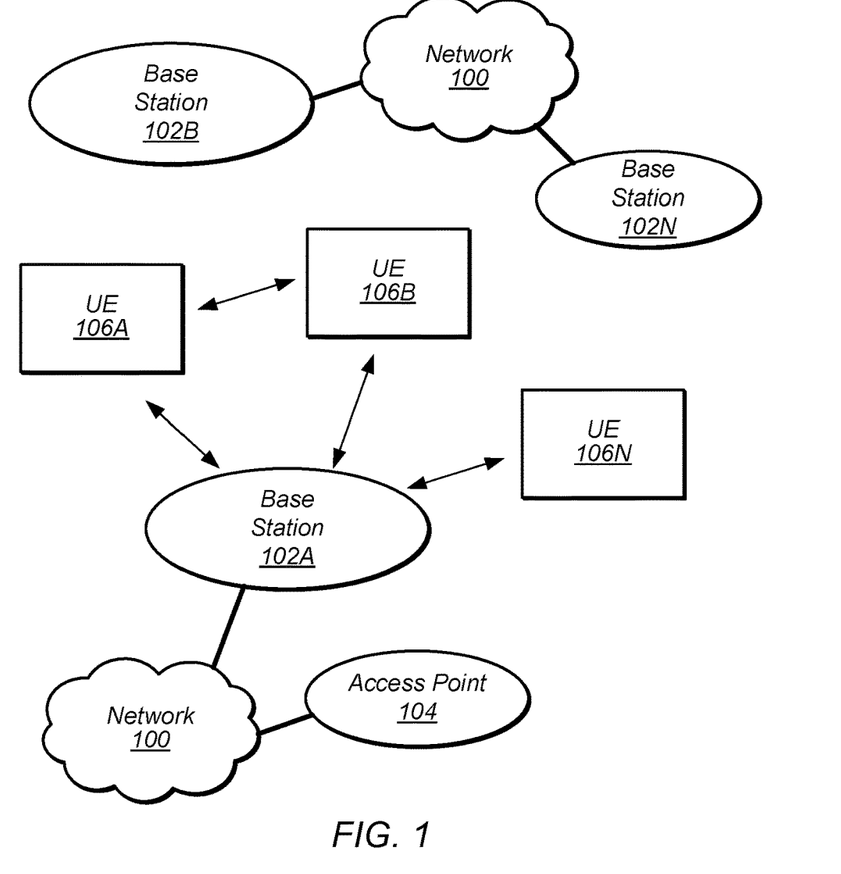
FIGS. 1-2 illustrate exemplary (and simplified) wireless communication systems.
Figure 2:
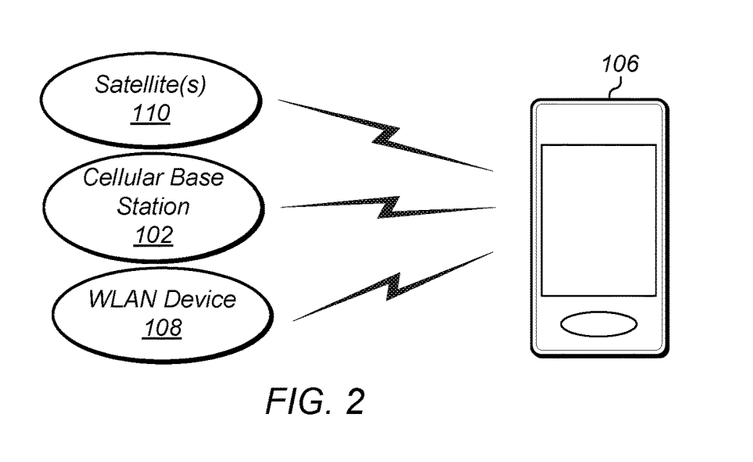

FIGS. 1 and 2—Communication System

FIG. 1 illustrates an exemplary (and simplified) wireless communication system, according to some embodiments. It is noted that the system of FIG. 1 is one example of a possible system, and embodiments may be implemented in any of various systems, as desired.

As shown, the exemplary wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc. Additionally, one or more access points (such as access point 104) may be communicatively coupled to the network 100. These may include Wi-Fi access points configured to support cellular network offloading and/or otherwise provide wireless communication services as part of the wireless communication system illustrated in FIG. 1.

As a still further (additional or alternative) possibility, in some embodiments multiple UEs may be able to communicate directly, for example using a peer-to-peer wireless communication technology such as Wi-Fi peer-to-peer or Bluetooth, or with one of the UEs acting as a Wi-Fi access point. For example, UE 106A and UE 106B are illustrated as being in direct communication in FIG. 1.

Base station 102A and other similar base stations (such as base stations 102B . . . 102N) and/or access points (such as access point 104) operating according to the same or a different wireless communication standard may thus be provided as a network of cells, which may provide continuous or nearly continuous overlapping service to UEs 106A-N and similar devices over a wide geographic area via one or more wireless communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations) and/or wireless local area networks (WLANs), which may be referred to as "neighboring cells" or "neighboring WLANs" (e.g., as appropriate), and/or more generally as "neighbors". Such neighbors may also be capable of facilitating communication between user devices and/or between user devices and the network 100. Such neighbors may include "macro" cells, "micro" cells, "pico" cells, "femto" cells, WLANs, and/or cells which provide any of various other granularities of service area size. For example, base stations 102A-B illustrated in FIG. 1 might provide macro cells, base station 102N might provide a micro cell, and access point 104 might be a Wi-Fi AP which provides a WLAN. Note also that in some instances, a UE (such as one of UEs 106A-N) may be served by multiple neighboring cells (e.g., a serving set), for example using coordinated multipoint (CoMP) wireless communication. Other configurations are also possible.

At least in some instances, a UE 106 may additionally be capable of receiving satellite communication signals. For example, one or more of the illustrated UEs 106 may be capable of utilizing one or more global navigational satellite systems (GNSS, e.g., GPS or GLONASS), and/or one or more other satellite-based communication systems.

Thus, a UE 106 may be capable of communicating using multiple wireless communication technologies. For example, a UE 106 might be configured to communicate using two or more of GSM, UMTS, CDMA2000, WiMAX, LTE, LTE-A, WLAN, Bluetooth, one or more global navigational satellite systems, one and/or more mobile television broadcasting standards (e.g., ATSC-M/H or DVB-H), etc. Other combinations of wireless communication technologies (including more than two wireless communication technologies) are also possible.

Figure 5:
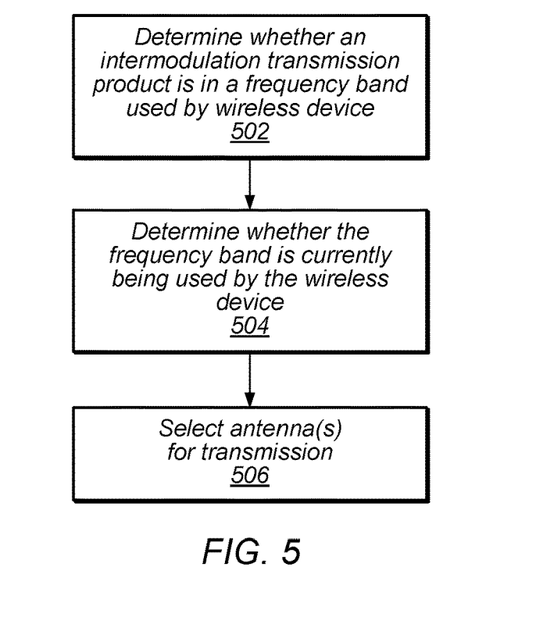
FIG. 5 is a flowchart diagram illustrating aspects of an exemplary method for performing adaptive antenna selection to reduce intermodulation interference.

Any or all of the network 100, base stations 102, access points 104, and/or UEs 106 illustrated in FIG. 1 may be configured to implement or support implementation of part or all of the methods described herein, including, inter alia, the method of FIG. 5.

FIG. 2 illustrates an exemplary (and simplified) system in which user equipment 106 (e.g., one of the devices 106A through 106N) is capable of using (e.g., concurrently and/or at different times) multiple wireless communication technologies. The UE 106 may be any of various types of device, such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple radio access technologies/wireless communication protocols. As one possibility, the UE 106 may be configured to communicate using at least one cellular communication technology, at least one wireless local area network technology, and at least one satellite communication technology. For example, as shown, the UE 106 may be capable of communicating with one or more satellites 110

(e.g., according to one or more GNSS technologies), one or more cellular base stations 102 (e.g., according to one or more cellular communication technologies), and/or one or more devices 108 available via a wireless local area network (e.g., according to one or more WLAN technologies). Other combinations of wireless communication technologies are also possible.

The UE 106 may include one or more antennas for communicating using the wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios that are shared between multiple wireless communication protocols and one or more radios that are used exclusively by a single wireless communication protocol. For example, the UE 106 might include a shared radio for communicating using either of LTE and 1×RTT (or LTE or GSM), and separate radios for communicating using each of Wi-Fi and GNSS. Other configurations are also possible.

Figure 3:
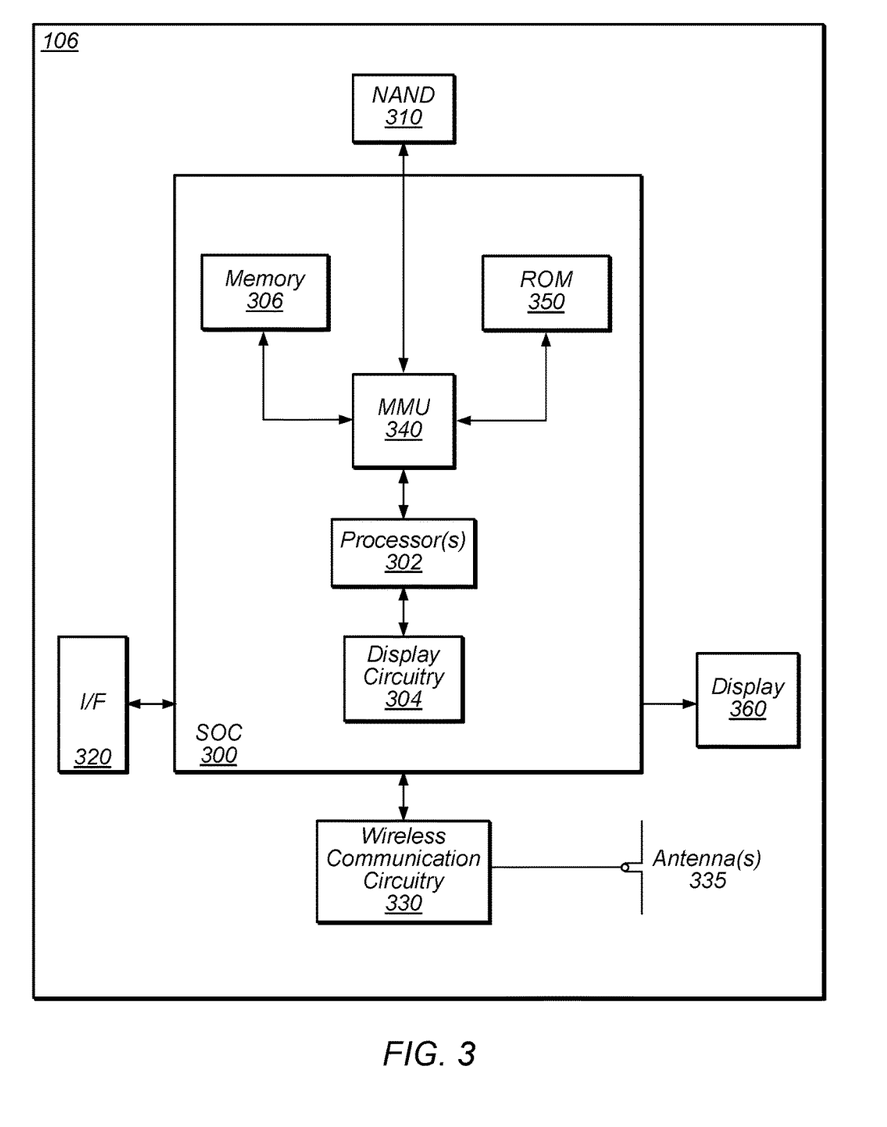
FIG. 3 illustrates a block diagram of an exemplary wireless device.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302, which may execute program instructions for the UE 106, and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio(s)) 330 (e.g., for LTE, Wi-Fi, GPS, etc.).

The UE device 106 may include at least one antenna, and in some embodiments multiple antennas, for performing wireless communication with base stations and/or other devices. For example, the UE device 106 may use antenna(s) 335 to perform the wireless communication. As noted above, the UE 106 may be configured to communicate wirelessly using multiple wireless communication standards in some embodiments.

As described further subsequently herein, the UE 106 may include hardware and software components for implementing part or all of the methods described herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Alternatively (or in addition) the processor(s) 302 of the UE device 106, in conjunction with one or more of the other components 300, 304, 306, 310, 320, 330, 335, 340, 350, 360 may be configured to implement part or all of the features described herein.

Figure 4:
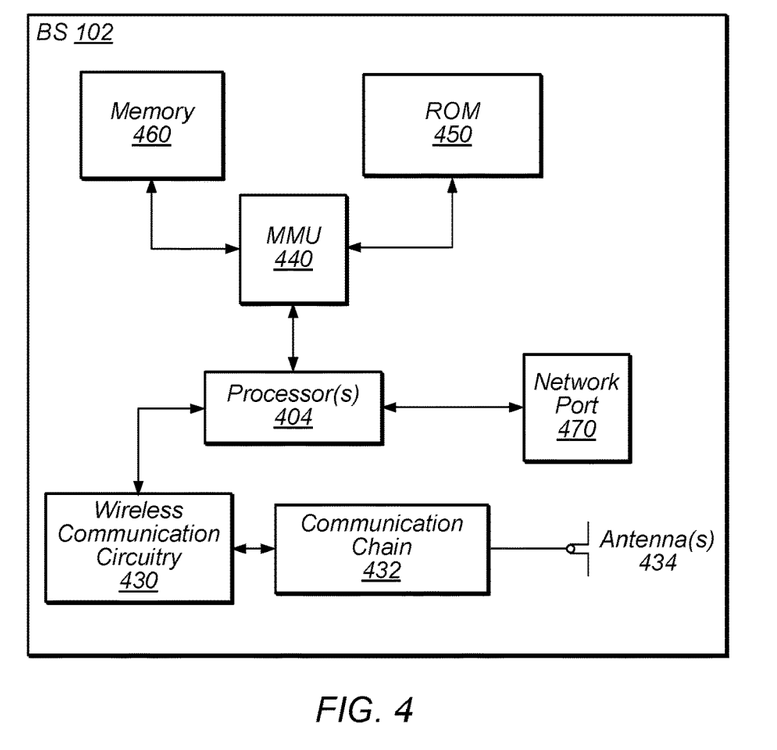
FIG. 4 illustrates a block diagram of an exemplary base station.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404, which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in relation to FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via wireless communication circuitry 430. The antenna(s) 434 communicates with the wireless communication circuitry 430 via communication chain 432. Communication chain 432 may be a receive chain, a transmit chain or both. In some implementations, communication chain 432 may include multiple receive chains, multiple transmit chains, or both. The wireless communication circuitry 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as either or both of an LTE base station and a Wi-Fi access point. As another possibility, the base station 102 may include a multi-mode radio, which is capable of performing communications according to any of multiple wireless communication technologies (e.g., LTE and Wi-Fi).

The BS 102 may include hardware and software components for implementing or facilitating implementation of part or all of the methods described herein. The processor(s) 404 of the base station 102 may be configured to implement or support implementation of part or all of the methods described herein, e.g., by executing program instructions stored on a memory medium (e.g., a non-transitory computer-readable memory medium). Alternatively, the processor(s) 404 may be configured as a programmable hardware element, such as an FPGA (Field Programmable Gate Array), or as an ASIC (Application Specific Integrated Circuit), or a combination thereof. Alternatively (or in addition) the processor(s) 404 of the BS 102, in conjunction with one or more of the other components 430, 432, 434, 440, 450, 460, 470 may be configured to implement or support implementation of part or all of the features described herein.

FIG. 5—Communication Flow Diagram

FIG. 5 is a communication/signal flow diagram illustrating an example method for adaptively performing antenna selection to reduce interference at a wireless device, according to some embodiments. Aspects of the method of FIG. 5 may be implemented by a wireless device such as UE 106 illustrated in and described with respect to FIGS. 1-3, or more generally in conjunction with any of the computer systems or devices shown in the above Figures, among other devices, as desired.

In various embodiments, some of the elements of the method shown may be performed concurrently, in a different order than shown, may be substituted for by other method elements, or may be omitted. Additional elements may also be performed as desired. As shown, the method may operate as follows.

The wireless device may determine whether an intermodulation product of its transmissions is in a frequency band also used, at least at some times, by the wireless device (502). Note that a frequency band subject to possible intermodulation interference from such intermodulation product(s) may be referred to as a "victim" frequency band herein, at least in some instances. At least in some embodiments, the determination may include determining whether an intermodulation product of transmissions according to first and second wireless communication technologies falls in a frequency band used by the wireless device for communication according to a third wireless communication technology. Note that the wireless communication technologies may include any of various possible wireless communication technologies. As one possibility, the first wireless communication technology may be a wireless local area networking (WLAN) technology (such as Wi-Fi), while the second wireless communication technology may be a cellular communication technology (such as GSM, UMTS, CDMA2000, LTE, LTE-A, etc.), and the third wireless communication technology may be a global navigational satellite system (GNSS) technology (such as Global Positioning System (GPS), GLONASS, Galileo, and/or BeiDou). Two of more of such technologies might be concurrently active, e.g., in a scenario in which a wireless device uses a cellular data connection to provide a mobile Wi-Fi hotspot and also provides GNSS based navigation, for example while in a motor vehicle, among various other possible scenarios. As another possibility, cellular and Bluetooth intermodulation could cause interference to GNSS, for example in a scenario in which a wireless device uses a cellular voice connection (e.g., VoLTE) in conjunction with a Bluetooth headset while also providing GNSS based navigation. As a still further possibility, Wi-Fi (e.g., in the 5 GHz band) and Bluetooth intermodulation could cause interference to GNSS, for example in a scenario in which a wireless device is providing visual GNSS based navigation information over a Wi-Fi connection to a vehicle-based display device and also providing audio GNSS based navigation information to a Bluetooth audio device. Other technologies/combinations of technologies are also possible.

In some embodiments, the wireless device may also or alternatively determine that another type of interference, such as interference caused by a harmonic of a communication frequency, falls in a frequency band also used by the wireless device. For example, as one possibility, the LTE B13 second harmonic could fall in a GNSS band, such that communication on the LTE band could potentially cause performance degradation to GNSS communication. An example of such a scenario would be a cellular voice connection (e.g., VoLTE) in conjunction with providing GNSS based navigation.

At least in some embodiments, determining whether an intermodulation or other product of transmissions by the wireless device according to first and/or second wireless communication technologies falls in a frequency band used by the wireless device for communication according to a third wireless communication technology may include several aspects. For example, the wireless device may determine whether each of the first and second wireless communication technology is active, and if so, which frequency (or frequencies) is (are) in use by each of the first wireless communication technology and the second wireless communication technology. Such determination of frequencies used in conjunction with the first and second wireless communication technologies may be at any desired level of granularity. For example, the frequencies determined may be those associated with specific channels (e.g., center frequency of an LTE channel on which the wireless device is camped and/or of a Wi-Fi channel of a Wi-Fi network of which the wireless device is a member) or frequency ranges (e.g., bands) currently associated with the first and second wireless communication technologies. As another possibility, in some instances the frequencies determined may be specific to transmission operations. For example, such determination might include determining a frequency for transmitting according to the first wireless communication technology (a "first transmission frequency") and determining a frequency for transmitting according to the second wireless communication technology (a "second transmission frequency").

Based on the frequencies being used for the first and second wireless communication technologies, it may be possible to determine any possible intermodulation products, harmonics, or other products that might be generated by the use of those frequencies. This may include calculating possible intermodulation products using one or more formulas based on the transmission frequencies of the first and second wireless communication technologies, referring to a look-up table in which intermodulation products associated with certain transmission frequency combinations and/or harmonics associated with certain transmission frequencies are indicated, or any of various other possible techniques for determining possible interference.

Once the possible product(s) of communications according to the first and second wireless communication technologies have been determined, it may be possible to determine whether any such product(s) might interfere with communication according to the third wireless communication technology. For example, the third wireless communication technology may operate in one or more frequency bands, and it may be possible to compare the frequencies of each determined intermodulation, harmonic, or other product(s) with the frequency band(s) used by the third wireless communication technology. Such a comparison may be performed using any desired level of granularity, potentially including determining whether a specific frequency of a product matches a specific frequency channel used (currently or in general) by the third wireless communication technology, determining whether there is overlap between a range of frequencies of possible products and a frequency band used (currently or in general) by the third wireless communication technology, and/or using any of various possible granularities for comparing frequencies.

Note that it may also be possible for the wireless device to determine whether a product of transmissions according to first and/or second wireless communication technologies is in a frequency band used by a third wireless communication technology without directly comparing frequencies of products with frequencies used by the third communication technology. For example, as previously noted, a look-up table may be used in conjunction with individual frequencies and/or frequency combinations of the first and/or second wireless communication technologies. If desired, such a look-up table could directly indicate that certain transmission frequencies and/or transmission frequency combinations may potentially result in interference to the third wireless communication technology, e.g., in addition to or instead of providing an indication of the intermodulation, harmonic, etc. products of those transmission frequencies and frequency combinations. Other such techniques are also possible.

At least in some embodiments, it may also be determined if the third wireless communication technology is active, and/or more generally if the victim frequency band is currently being used by the wireless device (504). For example, it may be determined if a module providing functionality according to the third wireless communication technology is active, and/or more specifically to determine a frequency and/or frequency band currently being used to communicate according to the third wireless communication technology.

Based at least in part on determining whether interference due to communication by the wireless device may be in a frequency band used by the wireless device, the wireless device may perform antenna selection for the communication (506). Such antenna selection may also possibly be based at least in part on determining whether the victim frequency band is currently being used by the wireless device (such as by determining if a wireless communication technology that uses that frequency band is active), however, it should be noted that antenna selection may be impacted by the determination of whether any intermodulation and/or harmonic products have the potential to cause interference even if no information is collected or available regarding whether the frequency or frequencies that might be affected by such interference are actively being used, if desired. For example, it may be possible (e.g., for implementation simplicity) to implement interference mitigating antenna selection techniques even without specific knowledge of whether a potential victim frequency band is currently in use.

Antenna selection may include selecting one or more antennas for transmitting according to the first wireless communication technology and/or selecting one or more antennas for transmitting according to the second wireless communication technology. As one possibility, antenna selection may be performed in a first manner if no potentially interfering products fall in a frequency band used by the wireless device, and in a second manner if a potentially interfering product does fall in a frequency band used by the wireless device. As another possibility, antenna selection may be performed in a first manner if no potentially interfering products fall in a frequency band used by the third wireless communication technology or if the third wireless communication technology is not currently active, and in a second manner if a potentially interfering product falls in a frequency band used by the third wireless communication technology and if the third wireless communication technology is currently active.

The first manner of antenna selection (e.g., the antenna selection process when there is not potential for interference) may include selecting antennas for transmitting according to the first and second wireless communication technology without regard for reducing or mitigating the interference effects of those transmissions. In at least some instances, this may include selecting a multi-antenna mode, selecting an antenna or antennas with good signal strength and/or quality characteristics in current conditions, and/or otherwise improving performance (e.g., throughput, latency, power consumption) of the first and second wireless communication technologies.

The second manner of antenna selection (e.g., the antenna selection process when there is potential for interference) may include selecting antennas for transmitting according to the first and second wireless communication technology in a manner that similarly includes performance related considerations associated with the first and second wireless communication technologies, but may further include considerations for reducing/mitigating the interference effects of those transmissions. This may include switching one or both of the first and second wireless communication technologies from multi-antenna modes to single-antenna modes (e.g., if not already in single antenna mode), as one possibility. As another possibility, this may include selecting an antenna for at least one of the first and second wireless communication technologies that provides increased isolation to an antenna (or antennas) used by the third wireless communication technology. Note that the antenna(s) that provide the most isolation may depend on the architecture of the wireless device, for example depending on the total number of antennas, distance between antennas, antenna polarization, device materials and their properties, etc. In some instances, the second manner of antenna selection may include consideration of which antenna combinations reduce or minimize an amount of receiver desensitization to the third wireless communication technology, and such an antenna combination may be selected.

Once antenna selection is complete, the wireless device may transmit signals according to the first and second wireless communication technologies using the selected antennas. Since the antenna selection process may be biased to reduce/mitigate interference to the third wireless communication technology when there is potential for such interference, the amount of such interference caused by the mixing product(s) of such transmissions may be reduced, e.g., in relation to other possible antenna combinations.

Figure 6:
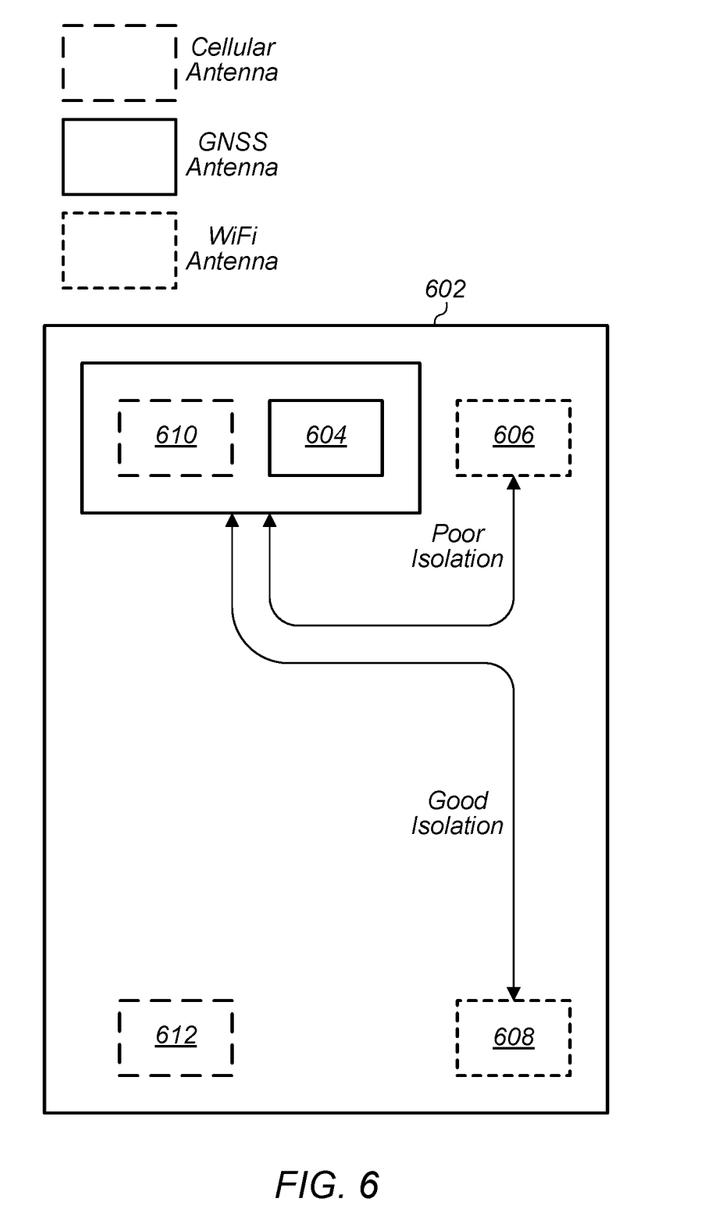
FIG. 6 is a block diagram illustrating examples of possible antenna locations of a wireless device.
Figure 7:
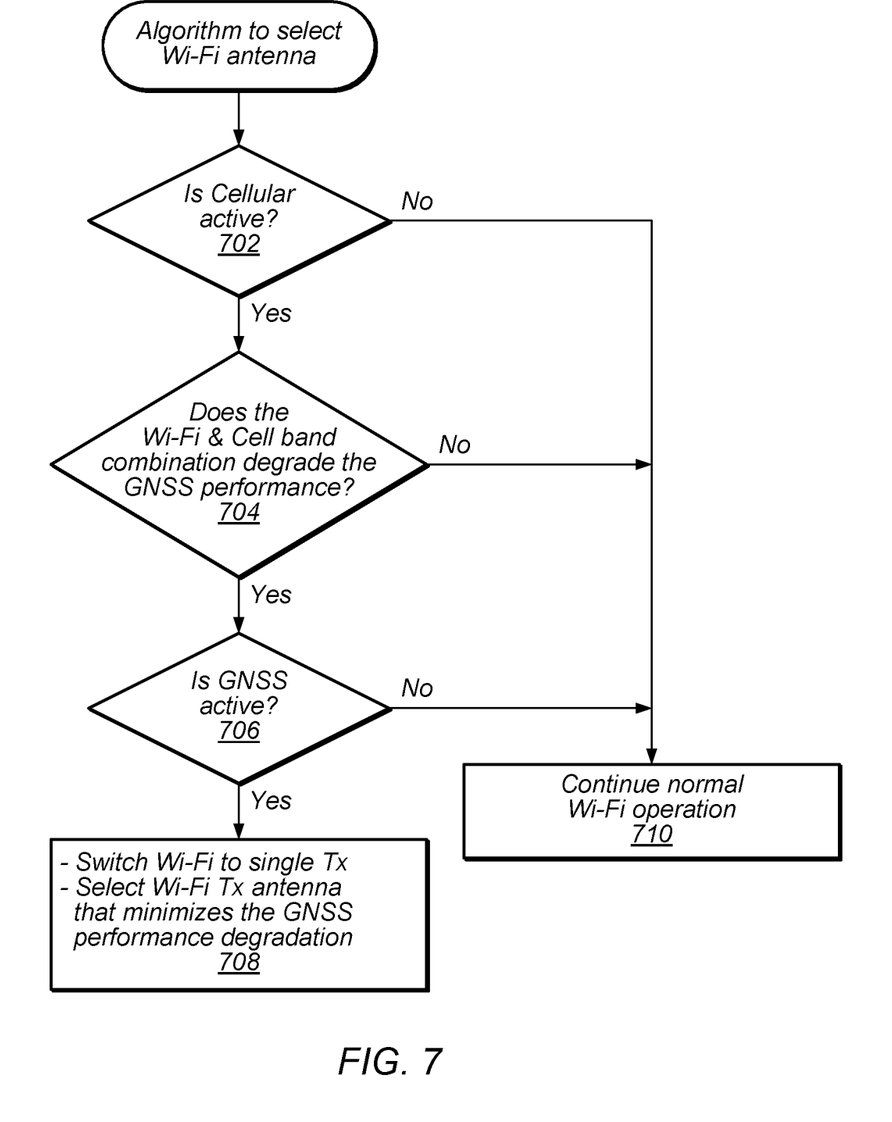
FIGS. 7-8 are flowchart diagrams illustrating exemplary possible Wi-Fi antenna selection algorithms that may reduce intermodulation interference.
Figure 8:
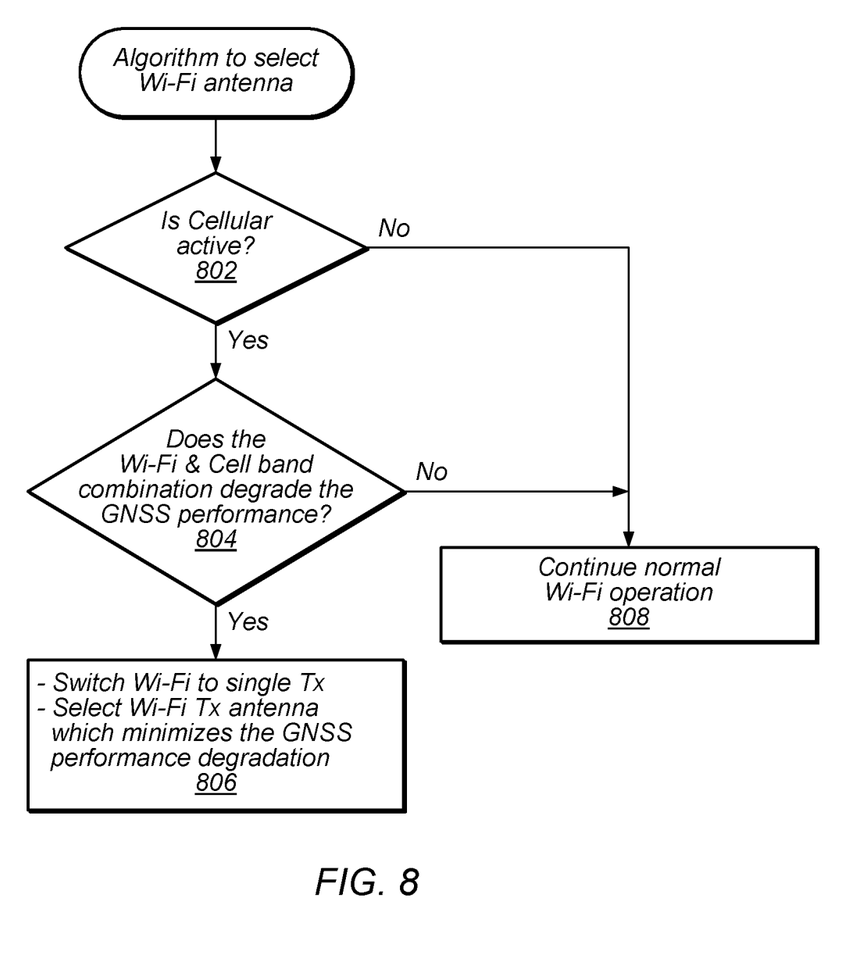

FIGS. 6-8—Additional Information

FIGS. 6-8 and the information provided herein below in conjunction therewith are provided by way of example of various considerations and details relating to possible systems in which the method of FIG. 5 and/or other aspects of this disclosure may be implemented, and are not intended to be limiting to the disclosure as a whole. Numerous variations and alternatives to the details provided herein below are possible and should be considered within the scope of the disclosure.

In a wireless device with cellular, Wi-Fi, and GNSS communication capability, it is possible that when both cellular and Wi-Fi antennas are transmitting simultaneously, certain cellular and Wi-Fi band combinations may cause intermodulation products to fall into the GNSS band and degrade GNSS performance. For example, a scenario might occur in which a cellular transmission is being performed at 851.6 MHz (e.g., LTE B20 Ch24346) and a Wi-Fi transmission is being performed at 2427 MHz (e.g., Wi-Fi Channel 4). One intermodulation product resulting from such transmissions may include 1575.4 MHz (Wi-Fi Tx−Cell Tx=2427−851.6=1575.4), which may affect GPS communications occurring at 1575.42 MHz. As another example, a scenario might occur in which a cellular transmission is being performed at 1872.3 MHz (e.g., LTE B2 Ch18823) and a Wi-Fi transmission is being performed at 5320 MHz (e.g., Wi-Fi Channel 64). One intermodulation product resulting from such transmissions may include 1575.4 MHz (Wi-Fi Tx−2*Cell Tx=5320−2*(1872.3)=1575.4), which may affect GPS communications occurring at 1575.42 MHz.

The isolation between the cellular, Wi-Fi, and GNSS antennas may be a key factor in determining the amount of performance degradation a GNSS receiver will suffer in such scenarios. For example, poor isolation may result in worse GNSS performance.

FIG. 6 is a block diagram illustrating an example of possible antenna locations within a multi-radio device 602. In the illustrated example, the wireless device 602 includes one GNSS antenna 604, two Wi-Fi antennas 606, 608, and two cellular antennas 610, 612.

In such a system with multiple cellular and Wi-Fi antennas (e.g., a device capable of Wi-Fi MIMO), certain antennas may have better isolation than others. In the illustrated example, Wi-Fi antenna 606 has relatively poor isolation while Wi-Fi antenna 608 has relatively good isolation. Thus, under circumstances in which there is potential for intermodulation interference or other interference effects to affect reception of GNSS communications, it may reduce such interference to select Wi-Fi and/or cellular antennas that provide greater isolation, potentially including switching to SISO mode if not already so configured.

Accordingly, FIGS. 7 and 8 are flowchart diagrams illustrating exemplary Wi-Fi antenna selection algorithms for a wireless device with Wi-Fi active to reduce interference to GNSS when GNSS activity information is available and when GNSS activity information is not available respectively.

According to the method of FIG. 7, as shown, it may be determined if a cellular radio of the wireless device is active (702). If the cellular radio of the wireless device is active, it may be determined if the combination of Wi-Fi and cellular bands used combine in a way that degrades GNSS performance (704). If the combination of Wi-Fi and cellular transmit frequencies does generate an IMD product in a GNSS band, it may be determined if a GNSS radio of the wireless device is active (706). If the GNSS radio of the wireless device is active, the wireless device may apply IMD interference mitigation considerations to the Wi-Fi antenna selection, potentially including switching Wi-Fi to single antenna transmit mode (e.g., if applicable) and/or selecting a Wi-Fi transmit antenna that reduces or minimizes GNSS performance degradation (708). If the cellular radio of the wireless device is not active, or if the combination of Wi-Fi and cellular transmit frequencies does not generate an IMD product in a GNSS band, or if the GNSS radio of the wireless device is not active, the wireless device may continue its normal Wi-Fi operation, potentially including using MIMO communication techniques (710).

According to the method of FIG. 8, as shown, it may be determined if a cellular radio of the wireless device is active (802). If the cellular radio of the wireless device is active, it may be determined if the combination of Wi-Fi and cellular bands used combine in a way that degrades GNSS performance (804). If the combination of Wi-Fi and cellular transmit frequencies does generate an IMD product in a GNSS band, the wireless device may apply IMD interference mitigation considerations to the Wi-Fi antenna selection, potentially including switching Wi-Fi to single antenna transmit mode (e.g., if applicable) and/or selecting a Wi-Fi transmit antenna that reduces or minimizes GNSS performance degradation (806). If the cellular radio of the wireless device is not active, or if the combination of Wi-Fi and cellular transmit frequencies does not generate an IMD product in a GNSS band, the wireless device may continue its normal Wi-Fi operation, potentially including using MIMO communication techniques (808).

Note that while FIGS. 7 and 8 relate to Wi-Fi antenna selection, a similar algorithm for performing cellular antenna selection could also or alternatively be implemented, and/or an algorithm that encompasses both cellular and Wi-Fi antenna selection could be implemented, if desired. In fact, if multiple antennas are being used for GNSS reception, an algorithm that encompasses cellular, Wi-Fi and GNSS antenna selection could be implemented if desired.

By performing antenna selection in such a manner that interference is mitigated (e.g., by selecting an antenna combination with good isolation whenever there is potential for intermodulation interference), the maximum possible jammer noise density to be expected by GNSS may effectively be reduced. This may in turn allow the GNSS block to use a lower (and potentially more accurate) jammer noise density estimate in such scenarios, which may further improve GNSS performance, at least in some embodiments.

In the following further exemplary embodiments are provided.

One set of embodiments may include an apparatus, comprising: a processing element; wherein the processing element is configured to: determine that an intermodulation product of transmissions according to first and second wireless communication technologies is in a frequency band used by a third wireless communication technology; and select one or more antennas used for the transmissions according to the first and second wireless communication technologies based at least in part on determining that an intermodulation product of the transmissions according to the first and second wireless communication technologies is in a frequency band used by the third wireless communication technology. According to some embodiments, the processing element is further configured to: determine whether the third wireless communication technology is active; and select the one or more antennas used for the transmissions according to the first and second wireless communication technologies based at least in part on determining that an intermodulation product of the transmissions according to the first and second wireless communication technologies is in a frequency band used by the third wireless communication technology if the third wireless communication technology is active, wherein selecting the one or more antennas used for the transmissions according to the first and second wireless communication technologies is not affected by determining that an intermodulation product of the transmissions according to the first and second wireless communication technologies is in a frequency band used by the third wireless communication technology if the third wireless communication technology is not active.

According to some embodiments, the first wireless communication technology is a wireless local area networking (WLAN) technology, the second wireless communication technology is a cellular communication technology, and the third wireless communication technology is a global navigational satellite system (GNSS) technology).

According to some embodiments, to select one or more antennas used for the transmissions according to the first and second wireless communication technologies based at least in part on determining that an intermodulation product of the transmissions according to the first and second wireless communication technologies is in a frequency band used by the third wireless communication technology, the processing element is further configured to: select the one or more antennas used for the transmissions according to the first and second wireless communication technologies to reduce performance degradation to the third wireless communication technology caused by the intermodulation product.

According to some embodiments, to select one or more antennas used for the transmissions according to the first and second wireless communication technologies based at least in part on determining that an intermodulation product of the transmissions according to the first and second wireless communication technologies is in a frequency band used by the third wireless communication technology, the processing element is further configured to: select the one or more antennas used for the transmissions according to the first and second wireless communication technologies to provide increased isolation for an antenna used by the third wireless communication technology.

According to some embodiments, to select one or more antennas used for the transmissions according to the first and second wireless communication technologies based at least in part on determining that an intermodulation product of the transmissions according to the first and second wireless communication technologies is in a frequency band used by the third wireless communication technology, the processing element is further configured to: switch at least one of the first wireless communication technology or the second wireless communication technology from a multi-antenna communication mode to a single-antenna communication mode.

An additional exemplary set of embodiments may include a wireless user equipment (UE) device, comprising: a plurality of antennas; one or more radios coupled to the plurality of antennas; and a processing element operably coupled to the one or more radios; wherein the UE device is configured to: determine whether an intermodulation product of cellular and Wi-Fi communication by the UE device is in a frequency band used by the UE device for global navigational satellite system (GNSS) communication; select one or more antennas for one or more of cellular or Wi-Fi communication by the UE device based at least in part on determining whether an intermodulation product of cellular and Wi-Fi communication by the UE device is in a frequency band used by the UE device for GNSS communication; and transmit Wi-Fi signals and cellular signals using the selected one or more antennas.

According to some embodiments, the UE device is further configured to: select the one or more antennas for one or more of cellular or Wi-Fi communication in a first manner if no intermodulation product of cellular and Wi-Fi communication by the UE device is in a frequency band used by the UE device for GNSS communication; and select the one or more antennas for one or more of cellular or Wi-Fi communication in a second manner if an intermodulation product of cellular and Wi-Fi communication by the UE device is in a frequency band used by the UE device for GNSS communication.

According to some embodiments, the UE device is further configured to: determine whether a GNSS module of the UE device is active; wherein selecting the one or more antennas for one or more of cellular or Wi-Fi communication by the UE device is further based at least in part on determining whether a GNSS module of the UE device is active.

According to some embodiments, the UE device is further configured to: select the one or more antennas for one or more of cellular or Wi-Fi communication in a first manner if no intermodulation product of cellular and Wi-Fi communication by the UE device is in a frequency band used by the UE device for GNSS communication or if no GNSS module of the UE device is active; and select the one or more antennas for one or more of cellular or Wi-Fi communication in a second manner if an intermodulation product of cellular and Wi-Fi communication by the UE device is in a frequency band used by the UE device for GNSS communication and a GNSS module of the UE device is active.

According to some embodiments, to select the one or more antennas for one or more of cellular or Wi-Fi communication by the UE device in the second manner, the UE device is further configured to: select a single antenna mode for Wi-Fi communication; and select an antenna for Wi-Fi communication with greatest isolation from a GNSS antenna.

According to some embodiments, to determine whether an intermodulation product of cellular and Wi-Fi communication by the UE device is in a frequency band used by the UE device for GNSS communication, the UE device is configured use one or more of: a lookup table indicating intermodulation products of selected frequency combinations; or one or more formulas for calculating intermodulation products of frequency combinations.

According to some embodiments, the UE device is further configured to: select an antenna combination that causes a lowest amount of receiver desensitization to GNSS communication among possible antenna combinations if it is determined that an intermodulation product of cellular and Wi-Fi communication is in a frequency band used by the UE device for GNSS communication.

A further set of exemplary embodiments may include a non-transitory computer accessible memory medium comprising program instructions that, when executed by a wireless user equipment (UE) device, cause the UE device to: determine a first transmission frequency for transmitting according to a first wireless communication technology; determine a second transmission frequency for transmitting according to a second wireless communication technology; calculate one or more intermodulation products of the first transmission frequency and the second transmission frequency; determine whether any of the one or more intermodulation products are in a frequency band associated with a third wireless communication technology; determine an activity status of the third wireless communication technology; perform antenna selection for transmitting signals according to at least one of the first wireless communication technology or the second wireless communication technology to reduce interference to the third wireless communication technology from the one or more intermodulation products if the third wireless communication technology is active and the one or more intermodulation products are in a frequency band associated with the third wireless communication technology.

According to some embodiments, to perform antenna selection to reduce interference to the third wireless communication technology from the one or more intermodulation products, the program instructions further cause the UE device to: switch from a multi-antenna transmission mode to a single-antenna transmission mode for at least one of the first wireless communication technology or the second wireless communication technology.

According to some embodiments, to perform antenna selection to reduce interference to the third wireless communication technology from the one or more intermodulation products, the program instructions further cause the UE device to: select a transmission antenna for at least one of the first wireless communication technology or the second wireless communication technology that provides increased isolation to an antenna used to receive signals according to the third wireless communication technology.

According to some embodiments, the first transmission frequency is associated with a frequency channel associated with the first wireless communication technology, and the second transmission frequency is associated with a frequency channel associated with the second wireless communication technology.

According to some embodiments, the first wireless communication technology is Wi-Fi, wherein to perform antenna selection to reduce interference to the third wireless communication technology from the one or more intermodulation products, the program instructions further cause the UE device to: switch Wi-Fi from multiple input multiple output (MIMO) mode to single output single input (SISO) mode; and select a Wi-Fi antenna among a plurality of available Wi-Fi antennas that provides greatest isolation to an antenna used to receive signals according to the third wireless communication technology.

According to some embodiments, the program instructions further cause the UE device to: perform antenna selection for transmitting signals according to the first wireless communication technology and the second wireless communication technology without regard to reducing interference to the third wireless communication technology from the one or more intermodulation products if none of the one or more intermodulation products are in a frequency band associated with the third wireless communication technology.

According to some embodiments, the program instructions further cause the UE device to: perform antenna selection for transmitting signals according to the first wireless communication technology and the second wireless communication technology without regard to reducing interference to the third wireless communication technology from the one or more intermodulation products if the third wireless communication technology is not active.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processing element configured to:
determine that simultaneous communication of a first wireless communication technology and a second wireless communication technology causes performance degradation to a third wireless communication technology, wherein said performance degradation is a result of intermodulation products associated with the first and second wireless communication technologies; and
select two or more antennas used for the simultaneous communication of the first wireless communication technology and the second wireless communication technology based at least in part on determining that the simultaneous communication of the first wireless communication technology and the second wireless communication technology causes performance degradation to the third wireless communication technology, wherein the two or more antennas are selected to reduce the intermodulation products.

2. The apparatus of claim 1, wherein the processing element is further configured to:
determine that the third wireless communication technology is active; and
select the two or more antennas used for the simultaneous communication of the first wireless communication technology and the second wireless communication technology based at least in part on determining that the simultaneous communication of the first wireless communication technology and the second wireless communication technology causes performance degradation to the third wireless communication technology when the third wireless communication technology is active.

3. The apparatus of claim 1,
wherein the first wireless communication technology comprises a wireless local area networking (WLAN) technology,
wherein the second wireless communication technology comprises a cellular communication technology,
wherein the third wireless communication technology comprises a global navigational satellite system (GNSS) technology).

4. The apparatus of claim 1, wherein to select two or more antennas used for the simultaneous communication of the first wireless communication technology and the second wireless communication technology based at least in part on determining that the simultaneous communication of the first wireless communication technology and the second wireless communication technology causes performance degradation to the third wireless communication technology, the processing element is further configured to:
select the two or more antennas used for the simultaneous communication of the first wireless communication technology and the second wireless communication technology to reduce performance degradation with respect to the third wireless communication technology.

5. The apparatus of claim 1, wherein to select two or more antennas used for the simultaneous communication of the first wireless communication technology and the second wireless communication technology based at least in part on determining that the simultaneous communication the first wireless communication technology and the second wireless communication technology causes performance degradation to the third wireless communication technology, the processing element is further configured to:
select the two or more antennas used for the simultaneous communication of the first wireless communication technology and the second wireless communication technology to provide increased isolation for an antenna used by the third wireless communication technology.

6. The apparatus of claim 1, wherein to select two or more antennas used for the simultaneous communication of the first wireless communication technology and the second wireless communication technology based at least in part on determining that the simultaneous communication of the first wireless communication technology and the second wireless communication technology causes performance degradation to the third wireless communication technology, the processing element is further configured to:
switch at least one of the first wireless communication technology or the second wireless communication technology from a multi-antenna communication mode to a single-antenna communication mode.

7. A wireless user equipment (UE) device, comprising:
a plurality of antennas;
one or more radios coupled to the plurality of antennas; and
a processing element operably coupled to the one or more radios;
wherein the UE device is configured to:
determine whether an intermodulation product of cellular and Wi-Fi communication by the UE device is in a frequency band used by the UE device for global navigational satellite system (GNSS) communication;
select two or more antennas for cellular and Wi-Fi communication by the UE device based at least in part on determining that the intermodulation product of cellular and Wi-Fi communication by the UE device is in the frequency band used by the UE device for GNSS communication, wherein the two or more antennas are selected to reduce the intermodulation product; and
transmit Wi-Fi signals and cellular signals using the selected two or more antennas.

8. The UE device of claim 7, wherein the UE device is further configured to:
select the two or more antennas for cellular and Wi-Fi communication in a first manner if no intermodulation product of cellular and Wi-Fi communication by the UE device is in the frequency band used by the UE device for GNSS communication; and
select the two or more antennas for cellular and Wi-Fi communication in a second manner if the intermodulation product of cellular and Wi-Fi communication by the UE device is in the frequency band used by the UE device for GNSS communication.

9. The UE device of claim 7, wherein the UE device is further configured to:
determine whether a GNSS module of the UE device is active;
wherein selecting the two or more antennas for cellular and Wi-Fi communication by the UE device is further based at least in part on determining whether the GNSS module of the UE device is active.

10. The UE device of claim 9, wherein the UE device is further configured to:
select the two or more antennas for cellular and Wi-Fi communication in a first manner if no intermodulation product of cellular and Wi-Fi communication by the UE device is in the frequency band used by the UE device for GNSS communication or if no GNSS module of the UE device is active; and
select the two or more antennas for cellular and Wi-Fi communication in a second manner if the intermodulation product of cellular and Wi-Fi communication by the UE device is in the frequency band used by the UE device for GNSS communication and the GNSS module of the UE device is active.

11. The UE device of claim 10,
wherein to select the two or more antennas for cellular and Wi-Fi communication by the UE device in the second manner, the UE device is further configured to:
select a single antenna mode for Wi-Fi communication; and
select an antenna for Wi-Fi communication with greatest isolation from a GNSS antenna.

12. The UE device of claim 7, wherein to determine whether the intermodulation product of cellular and Wi-Fi communication by the UE device is in the frequency band used by the UE device for GNSS communication, the UE device is configured use one or more of:
a lookup table indicating intermodulation products of selected frequency combinations; or
one or more formulas for calculating intermodulation products of frequency combinations.

13. The UE device of claim 7, wherein the UE device is further configured to:
select an antenna combination that causes a lowest amount of receiver desensitization to GNSS communication among possible antenna combinations if it is determined that the intermodulation product of cellular and Wi-Fi communication is in the frequency band used by the UE device for GNSS communication.

14. A method for operating a user equipment (UE) device, the method comprising:
- determining a first transmission frequency for transmitting according to a first wireless communication technology;
- determining a second transmission frequency for transmitting according to a second wireless communication technology;
- determining one or more frequencies on which intermodulation products are generated from simultaneously transmitting on the first transmission frequency and the second transmission frequency;
- determining whether any of the one or more frequencies on which intermodulation products are generated at least partially overlap a frequency band associated with a third wireless communication technology;
- determining an activity status of the third wireless communication technology;
- performing antenna selection for transmitting signals according to at least one of the first wireless communication technology or the second wireless communication technology to reduce interference to the third wireless communication technology if the third wireless communication technology is active and the one or more frequencies on which intermodulation products are generated at least partially overlap a frequency band associated with the third wireless communication technology, wherein the antenna selection is performed to reduce the intermodulation products.

15. The method of claim 14, wherein performing antenna selection to reduce interference to the third wireless communication technology further comprises:
- switching from a multi-antenna transmission mode to a single-antenna transmission mode for at least one of the first wireless communication technology or the second wireless communication technology.

16. The method of claim 14, wherein performing antenna selection to reduce interference to the third wireless communication technology further comprises:
- selecting a transmission antenna for at least one of the first wireless communication technology or the second wireless communication technology that provides increased isolation to an antenna used to receive signals according to the third wireless communication technology.

17. The method of claim 14,
- wherein the first transmission frequency is associated with a frequency channel associated with the first wireless communication technology,
- wherein the second transmission frequency is associated with a frequency channel associated with the second wireless communication technology.

18. The method of claim 14,
- wherein the first wireless communication technology is Wi-Fi,
- wherein performing antenna selection to reduce interference to the third wireless communication technology further comprises:
  - switching Wi-Fi from multiple input multiple output (MIMO) mode to single output single input (SISO) mode; and
  - selecting a Wi-Fi antenna among a plurality of available Wi-Fi antennas that provides greatest isolation to an antenna used to receive signals according to the third wireless communication technology.

19. The method of claim 14, the method further comprising:
- performing antenna selection for transmitting signals according to the first wireless communication technology and the second wireless communication technology without regard to reducing interference to the third wireless communication technology if none of the one or more frequencies on which intermodulation products are generated overlap a frequency band associated with the third wireless communication technology.

20. The method of claim 14, the method further comprising:
- performing antenna selection for transmitting signals according to the first wireless communication technology and the second wireless communication technology without regard to reducing interference to the third wireless communication technology if the third wireless communication technology is not active.

* * * * *